(12) United States Patent
Eddy

(10) Patent No.: US 6,430,906 B1
(45) Date of Patent: Aug. 13, 2002

(54) MOWER DECK ATTACHED TRIMMER

(76) Inventor: Kevin Eddy, P.O. Box 246, 1026 Giddings, Kelley, IA (US) 50134-0246

( * ) Notice: Subject to any disclaimer, the term of this patent is extended or adjusted under 35 U.S.C. 154(b) by 0 days.

(21) Appl. No.: 09/877,879

(22) Filed: Jun. 8, 2001

(51) Int. Cl.[7] .............................................. A01D 34/03
(52) U.S. Cl. ..................................... 56/13.7; 56/12.7
(58) Field of Search ................................. 56/12.7, 11.3, 56/11.6, 11.8, 10.4, 13.6, 13.7, 16.9, DIG. 9, 17.4, 17.5

(56) References Cited

U.S. PATENT DOCUMENTS

| 3,261,150 A | 7/1966 | Fitzgerald, Sr. | |
| 4,949,536 A | 8/1990 | Neufeld | |
| 5,167,108 A | 12/1992 | Bird | |
| D334,200 S | 3/1993 | Clifton | |
| 5,598,689 A | 2/1997 | Bork | |
| 5,966,914 A * | 10/1999 | Reents | 56/16.7 |
| 6,301,863 B1 * | 10/2001 | Liebrecht | 56/10.6 |

FOREIGN PATENT DOCUMENTS

EP         0514209 A1      5/1992

* cited by examiner

Primary Examiner—Robert E. Pezzuto
(74) Attorney, Agent, or Firm—Gene Scott-Patent Law & Venture Group

(57) ABSTRACT

A mower attachment is used for trimming with spinning lines. The attachment provides a takeoff and trimming shafts coupled by a drive belt and tensioned with a tension pulley positioned by a tension spring and tension arm against the drive belt. Guards are positioned around the spinning lines for safety.

1 Claim, 1 Drawing Sheet

MOWER DECK ATTACHED TRIMMER

BACKGROUND OF THE INVENTION

1. Field of the Invention

This invention relates generally to lawn grooming attachments for riding style lawn equipment and more particularly to a trimmer for mounting onto a lawn maintenance vehicle.

2. Description of Related Art

The following art defines the present state of this field:

Clifton, U.S. Pat. No. D334,200 provides an ornamental design for a lawn trimmer attachment for a riding lawn mower.

Fitzgerald, Sr., U.S. Pat. No. 3,261,150 describes an attachment for a vehicle including means adapted to be positioned about a vertical member disposed laterally relative to the line of travel of the vehicle comprising a frame member attachable to said vehicle and extending laterally relative to the centerline of the vehicle, a first arm member pivotally connected to said frame member for pivotal movement in a horizontal plane, a second arm member pivotally connected to said frame member for pivotal movement in a horizontal plane, working means mounted on the free ends of said arm members, a first housing means mounted on the working means of said first arm member, a second housing means mounted on the working means of said second arm member, said second housing means being disposed outwardly relative to said first housing means and engageable therewith, yieldable means maintaining said first arm member in a pre-selected position, extending forwardly and disposed angularly inwardly relative to the centerline of said vehicle, biasing means operative interconnecting said arm members for urging said first and second housing means into engagement and means for transmitting drive from a power take-off of said vehicle to said working means.

Neufeld, U.S. Pat. No. 4,949,536 describes a lawn and garden trimmer apparatus including a framework with means for mounting the framework to a lawn mower body, a guide rail supported between opposed sides of the framework, a carrier bracket moveably mounted on the rail, a support arm pivotally mounted to the bracket, and a trimmer assembly mounted to the outer end of the support arm. Through a combination of rotational and linear degrees of freedom, the trimmer assembly may be located at various positions and angular attitudes relative to the lawn mower body.

Bird, U.S. Pat. No. 5,167,108 describes a power lawn mower with a trimmer attachment pivotally attached to the mower deck and positioned adjacent a side edge of the deck to trim those areas not accessible to the mower blade. When a fixed obstacle such as a fence post or tree is encountered, the attachment is rotated on a pivotal support arm against the force of a spring to a position adjacent the rear edge of the mower deck. When the obstacle has been passed, the force of the spring returns the trimmer to the side edge of the mower deck. The trimmer attachment is operated by a drive belt driven from the lawn mower engine and the trimmer attachment support arm includes a pair of overlapping telescoping members and a spring contained in one of the telescoping members to apply an outward force on the other telescoping member resulting in a positive tension being applied to the drive belt. The trimmer attachment may be retracted to the rear edge of the mower deck by operation of a lever mechanism and a link attached to the support arm. A stop member on the mower deck defines a limit of travel for the support arm and continued application of force to the lever causes the telescoping support arm to be shortened and the drive belt to be disengaged from the trimmer head.

Bork, U.S. Pat. No. 5,598,689 describes an attachment or auxiliary mowing unit for riding mowers of all types having a centrally mounted mower deck. The auxiliary unit consists of a separate mower deck that is pivotly attached to the main mower deck near a front corner of the main deck, preferably the left front corner. The auxiliary deck is attached on pivots with horizontal axes that allow the auxiliary deck to pivot freely upwardly and downwardly about that axis. The auxiliary deck is powered directly from the main deck or by a separate hydraulic motor.

Fassauer, EP 0514209 describes an air-floated apparatus for use as a lawn mower or vacuum cleaner. In one embodiment, the apparatus comprises a housing having an outer shroud and an inner shroud, the outer shroud surrounding a predetermined portion of the inner shroud to define a pressure chamber between the inner and outer shrouds and a vacuum chamber within the inner shroud. A drive mechanism includes a motor having a rotatable shaft. A single impeller is supported in the pressure chamber and rotates on the shaft for exhausting air from the vacuum chamber to erect grass underlying the opening while simultaneously pressurizing air in the pressure chamber to float the apparatus above the grass. Airborne cut grass clippings are vacuumed into and through the impeller for distribution into the soil for recycle and recut. According to the invention, and adjustment assembly is provided for adjusting a position of the housing relative to a center-line auxiliary wheel assembly. The air-floated wheeled apparatus may include an edger and a trimmer.

The prior art teaches the use of similar lawn trimming equipment but does not teach a simplified trimming device that may be manufactured at low cost and is robust and easy to mount and use. The present invention fulfills these needs and provides further related advantages as described in the following summary.

SUMMARY OF THE INVENTION

The present invention teaches certain benefits in construction and use which give rise to the objectives described below.

A mower attachment is used for trimming with spinning lines. The attachment provides a takeoff and trimming shafts coupled by a drive belt and tensioned with a tension pulley positioned by a tension spring and tension arm against the drive belt. Guards are positioned around the spinning lines for safety.

A primary objective of the present invention is to provide an apparatus and method of use of such apparatus that provides advantages not taught by the prior art.

Another objective is to provide such an invention capable of trimming high grass with power takeoff from a rider mower.

A further objective is to provide such an invention having simple construction.

A still further objective is to provide such an invention capable of easy installation and operation.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

Figure 1:
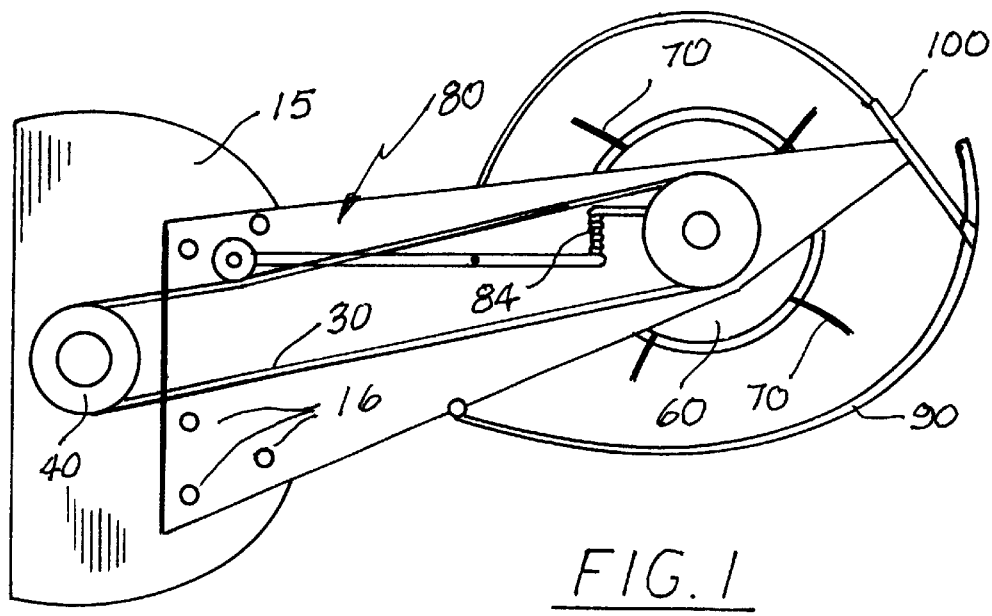
FIG. 1 is a top plan view of the preferred embodiment of the invention.
Figure 2:
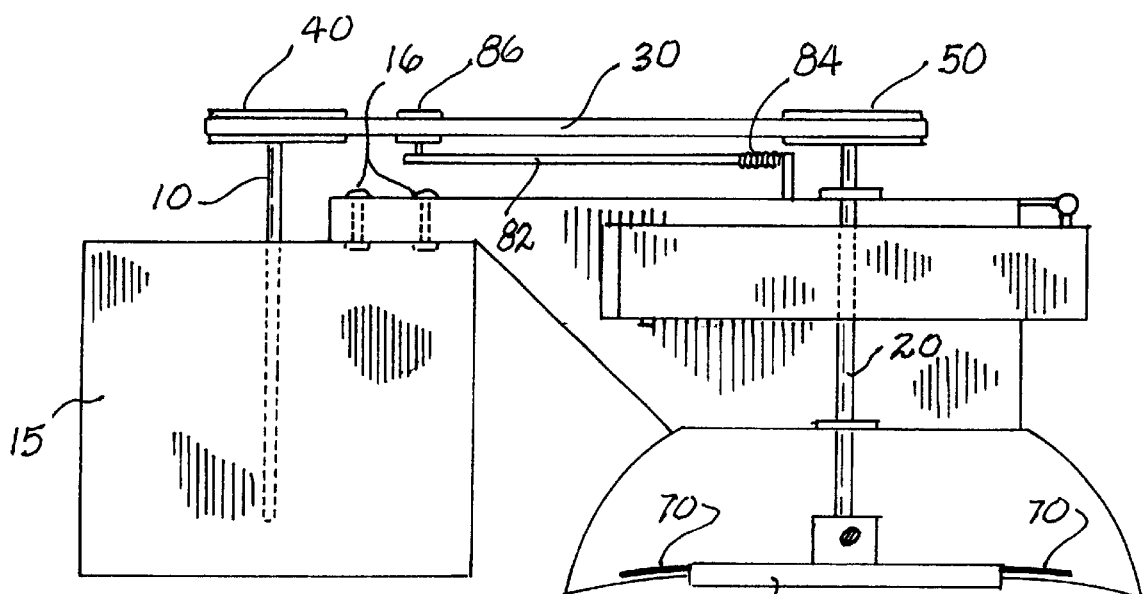
FIG. 2 is a side elevation view thereof.

The above described drawing figures illustrate the invention in at least one of its preferred embodiments, which is further defined in detail in the following description. The present invention is a mower deck attached trimming apparatus for lawn maintenance. It includes a takeoff drive shaft 10 as best seen in FIG. 2, which is enabled for rotation by a rider lawn mower. Such a takeoff shaft 10 and its coupling to the mower is well known in the art and in this case, the attachment is by bolts 16 to the mower's deck 15. The takeoff drive shaft 10 is coupled to a trimmer drive shaft 20 through a drive belt 30 engaged between a takeoff drive shaft pulley 40 and a trimmer drive shaft pulley 50. The trimmer drive shaft 20 is fixtured with a trimmer head 60 engaging plural weed cutting lines 70 radially mounted on and extending outwardly from it. A tensioning means 80 includes a tensioning bar 82 held by a tensioning spring 84 holding an idler pulley 86 in position against the drive belt 30 so as to cause the drive belt to exert tension on the takeoff drive shaft pulley 40 and the trimmer drive shaft pulley 50 for power transfer between them so as to drive the trimmer drive shaft 20 to rotate the trimmer head 60 for trimming weeds and high grass. A debris shield 90 and slide guard 100 are mounted and positioned as shown in FIG. 1, to enclose the trimmer head 60 so that debris cannot be easily thrown from the spinning cutting lines 70.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A mower deck attached trimming apparatus for lawn maintenance which comprises: a trimmer deck mounted to a mower deck by plural bolts, a takeoff drive shaft enabled for rotation by a rider lawn mower; the takeoff drive shaft coupled to a trimmer drive shaft through a drive belt engaged with a takeoff drive shaft pulley and a trimmer drive shaft pulley; the trimmer drive shaft fixtured with a trimmer head engaging plural weed cutting lines radially mounted on and extending outwardly therefrom; a tensioning bar positioned by a tensioning spring to hold an idler pulley against the drive belt so as to cause the drive belt to exert tension on the takeoff drive shaft pulley and the trimmer drive shaft pulley for power transfer therebetween; a debris shield and slide guard mounted and positioned to enclose the trimmer head.

\* \* \* \* \*